US012608163B2

(12) United States Patent
Wong et al.

(10) Patent No.: US 12,608,163 B2
(45) Date of Patent: *Apr. 21, 2026

(54) TECHNIQUES FOR MANAGED NAND TRANSLATION WITH EMBEDDED MEMORY SYSTEMS

(71) Applicant: Micron Technology, Inc., Boise, ID (US)

(72) Inventors: Wanmo Wong, Menlo Park, CA (US); Brady L. Keays, Kuna, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/660,112

(22) Filed: May 9, 2024

(65) Prior Publication Data

US 2024/0361961 A1     Oct. 31, 2024

Related U.S. Application Data

(62) Division of application No. 17/458,781, filed on Aug. 27, 2021, now Pat. No. 12,001,727.

(60) Provisional application No. 63/071,756, filed on Aug. 28, 2020.

(51) Int. Cl.
*G06F 3/06* (2006.01)
(52) U.S. Cl.
CPC ............ *G06F 3/0661* (2013.01); *G06F 3/061* (2013.01); *G06F 3/0632* (2013.01); *G06F 3/0688* (2013.01)
(58) Field of Classification Search
CPC ...... G06F 3/0688; G06F 3/061; G06F 3/0632; G06F 3/0661
See application file for complete search history.

(56) References Cited

U.S. PATENT DOCUMENTS

| 9,710,377 | B1 * | 7/2017 | Kuzmin | ................. | G06F 8/654 |
| 2007/0011385 | A1 | 1/2007 | Deng et al. | | |
| 2008/0005496 | A1 | 1/2008 | Dreps et al. | | |

(Continued)

FOREIGN PATENT DOCUMENTS

| CN | 101405708 A | 4/2009 |
| CN | 101566975 A | 10/2009 |

OTHER PUBLICATIONS

Chinese patent office, "CN Notice of Allowance, including Search Report," issued in connection with China Patent Application No. 202110996902.5 dated Jul. 18, 2024 (8 pages total; 4 pages Original & 4 pages machine translation).

*Primary Examiner* — Chie Yew
(74) *Attorney, Agent, or Firm* — Holland & Hart LLP

(57)     ABSTRACT

Methods, systems, and devices for techniques for managed NAND translation with embedded memory systems are described. A host system may generate a first command to access a logical memory address associated with a memory system. The host system may identify a physical memory address of the memory system based on generating the first command. The host system may output to the memory system a second command and the physical memory address, where the second command may be communicated to the memory device using a protocol associated with a controller of the memory system. The memory system may then access memory cells in a memory device associated with the physical memory address based on receiving the second command and the physical memory address.

15 Claims, 9 Drawing Sheets

(56)          References Cited

U.S. PATENT DOCUMENTS

| | | |
|---|---|---|
| 2018/0267706 A1 | 9/2018 | Li et al. |
| 2018/0267901 A1 | 9/2018 | Zhou et al. |
| 2019/0138440 A1* | 5/2019 | Lee ...................... G06F 3/0679 |
| 2019/0258514 A1 | 8/2019 | Miao et al. |

* cited by examiner

100

405 — Receive First Command

410 — Receive First Command Payload

415 — Receive Data

420 — Receive Second Command

425 — Output Firmware Status

400

505 — Receive First Command

510 — Receive First Command Payload

515 — Receive First Set of Data

520 — Receive Second Set of Data

525 — Receive Second Command

530 — Output Firmware Status

500

605 — Receive First Command

610 — Receive First Command Payload

615 — Receive Second Command

620 — Output Firmware Status

625 — Output Read and Spare Data

600

705 — Receive First Command

710 — Receive First Command Payload

715 — Receive Second Command

720 — Output Firmware Status

725 — Output First Read and Spare Data

730 — Output Second Read and Spare Data

700

Command Generator

810

Receiver Component

820

Receiver Manager

830

Physical Memory Address Identifier

815

Access Component

825

Configuration Component

835

805

800

TECHNIQUES FOR MANAGED NAND TRANSLATION WITH EMBEDDED MEMORY SYSTEMS

CROSS REFERENCE

The present application for patent is a divisional of U.S. patent application Ser. No. 17/458,781 by Wong et al., entitled "TECHNIQUES FOR MANAGED NAND TRANSLATION WITH EMBEDDED MEMORY SYSTEMS," filed Aug. 27, 2021 which claims priority to and the benefit of U.S. Provisional Patent Application No. 63/071, 756 by WONG et al., entitled "TECHNIQUES FOR MANAGED NAND TRANSLATION WITH EMBEDDED MEMORY SYSTEMS," filed Aug. 28, 2020, each of which is assigned to the assignee hereof, and each of which is expressly incorporated by reference in its entirety herein.

BACKGROUND

The following relates generally to one or more systems for memory and more specifically to techniques for managed NAND translation with embedded memory systems.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D Xpoint), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Some memory systems may be examples of managed memory (e.g., managed NAND). In such examples, the memory system may include a controller embedded within the memory system to handle various operations (e.g., wear leveling, block management, error correction code (ECC), translation, etc.). For example, the memory system may be an example of an embedded memory system integrated with a host system (e.g., embedded MultiMediaCard (eMMC) memory system). Other memory system may be examples of other types of memory (e.g., NAND not associated with an eMMC system). In such examples, a host system may include a controller to handle various operations (e.g., wear leveling, bad block management, ECC, translation, etc.) for the memory system. For example, the host system coupled with the memory system may use translation techniques to access memory cells in the memory system. In some examples, the host controller may have a larger storage capacity than the controller of the managed memory system and may therefore perform translation operations faster. It may be advantageous to use the translations techniques of raw memory systems on embedded memory systems.

Systems, devices, and techniques are described for implementing translations techniques at a host system and converting commands into a protocol that is configured to be communicated with an embedded memory system that is coupled with the host system. For example, the host system may be configured to translate a logical address associated with an access command into a physical address corresponding to physical memory locations at the memory system using translation techniques. The host system may then convert the access command into a protocol that is configured to be communicated over a bus associated with the embedded memory system. That is, the host system may translate the access command into a first protocol before converting the access command into a second protocol to communicate with the embedded memory system. The embedded memory system may have a multi-media controller configured to receive the access command and interpret the command generated using the translations techniques at the host system. The multi-media controller may also access one or more memory devices of the embedded memory system based on receiving the access command from the host system.

Features of the disclosure are initially described in the context of systems as described with reference to FIGS. 1 and 2. Features of the disclosure are described in the context diagrams as described with reference to FIGS. 3-7. These and other features of the disclosure are further illustrated by and described with reference to an apparatus diagram and a flowchart that relate to techniques for managed NAND translation with embedded memory systems as described with reference to FIGS. 8 and 9.

Figure 1:
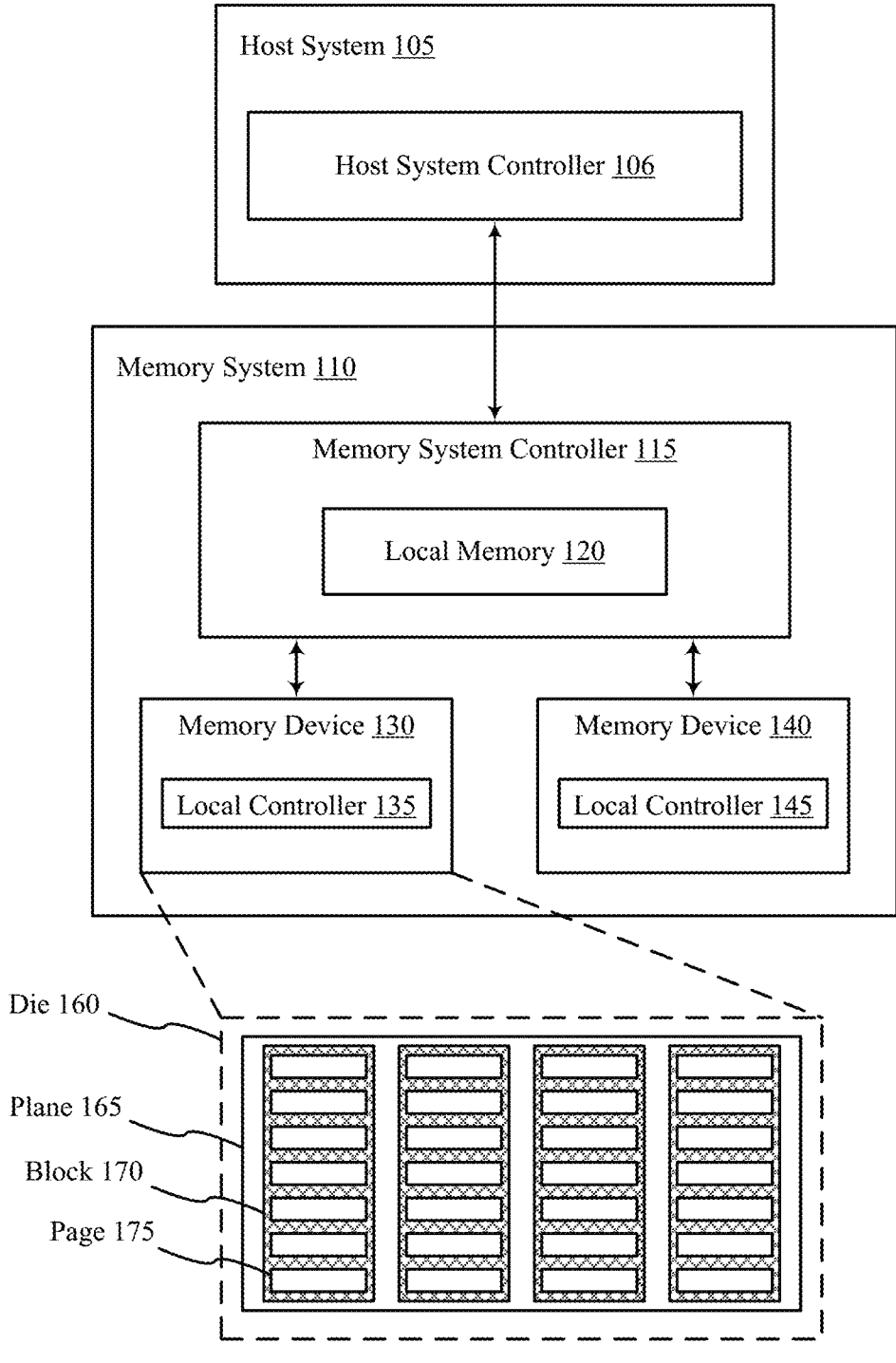
FIG. 1 illustrates an example of a system that supports techniques for managed NAND translation with embedded memory systems in accordance with examples as disclosed herein.

FIG. 1 illustrates an example of a system 100 that supports techniques for managed NAND translation with embedded memory systems in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, the memory system 110 may include any quantity of memory devices 130 and memory devices 140, and that, in some cases, memory system 110 may lack either a memory device 130 or a memory device 140. In some cases, the memory system 110 may be an example of an eMMC system and the memory system controller 115 may be an example of an eMMC controller. In some cases, the memory system 110 may be an example of a UFS system and the memory system controller 115 may be an example of a UFS controller. In some cases, the memory system 110 may be an example of a non-volatile memory express (NVMe) system and the memory system controller 115 may be an example of a NVMe controller. A NVMe system may use a non-volatile memory host controller interface specification (NVMHCIS) or accessing non-volatile storage media attached via PCIe bus.

The memory system controller 115 may be coupled with and communicate with the host system 105 (e.g., via the physical host interface). The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof. In some cases, the local controller 135 may be examples of a NAND controller.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (Fe-RAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, a memory device 130 may be or include a NAND device (e.g., NAND flash device). The memory device 130 may be a package that includes one or more dies 160. A die 160 may, in some examples, be a piece of electronics-grade semiconductor cut from a wafer (e.g., a silicon die cut from a silicon wafer). In some examples, each die 160 may be considered an example of a logical unit (LUN). Other examples of LUNs are also included within the scope of this disclosure. A LUN may be an example of a NAND die that is independent accessible from other LUNs in a system. Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete, and update an L2P mapping table to associate the logical address (e.g., LBA) for the data with the new, valid block 170 rather than the old, invalid block 170. In some cases, such copying and remapping may be preferable to erasing and rewriting the entire old block 170, due to latency or wear considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for most or all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

In some examples, the system 100 may include an embedded memory system 110 (e.g., eMMC) and the host system 105 may be configured to translate a logical address associated with an access command into a physical memory address using translation techniques. That is, the L2P table mapping table may be stored at the host system 105 rather than the memory system 110 (or the multimedia controller of the memory system 110). In some examples, having the host system 105 perform the L2P table mapping may decrease the size of the SRAM in the memory system controller 115. Additionally, the host system 105 may convert the access command into a protocol that is configured to be communicated with the memory system 110. That is, the host system 105 may be configured to communicate with the memory system 110 using a first and second protocol. The memory system 110 may be configured to interpret both protocols and access the one or more memory devices 130 and 140 based on converting the access command. In some examples, the first protocol may be an eMMC protocol and the second protocol may be an MFTL eMMC protocol. In some cases, by implementing the MFTL eMMC protocol, the memory system 110 may increase the efficiency of managing the NAND in memory device 130.

The system 100 may include any quantity of non-transitory computer readable media that support techniques for managed NAND translation with embedded memory systems. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform associated functions as described herein.

Figure 2:
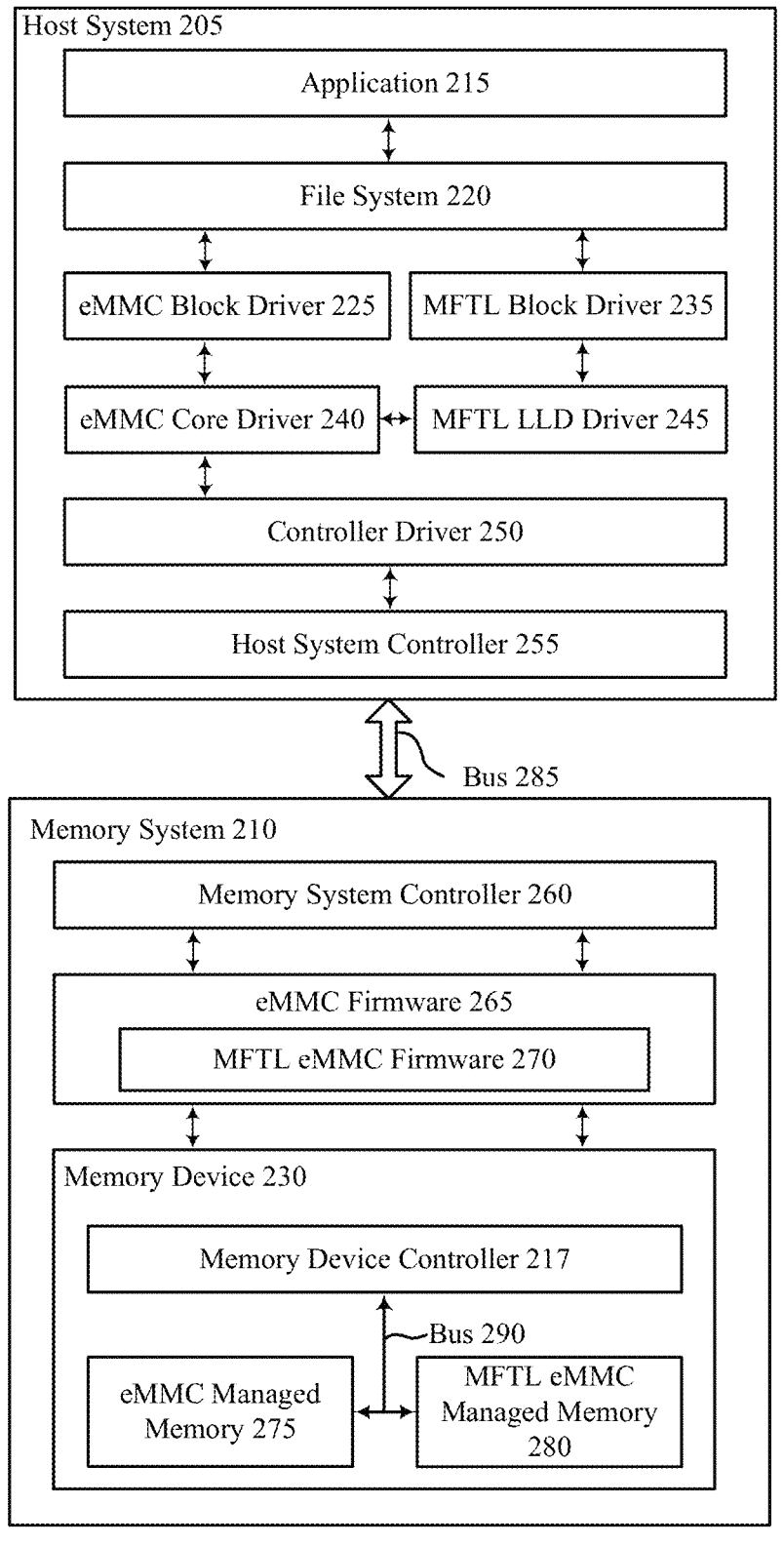
FIG. 2 illustrates an example of a system that supports techniques for managed NAND translation with embedded memory systems in accordance with examples as disclosed herein.

FIG. 2 illustrates an example of a system 200 that supports techniques for managed NAND translation with embedded memory systems in accordance with examples as disclosed herein. System 200 may include a host system 205, a memory system 210, and a bus 285 that couples the host system 205 with the memory system 210. Host system 205 may be an example of host system 105, as described with reference to FIG. 1. Memory system 210 may be an example of memory system 110, as described with reference to FIG. 1. The host system 205 may further include an application 215, file system 220, eMMC block driver 225, MFTL block driver 235, eMMC core driver 240, MFTL LLD driver 245, controller driver 250, and a host system controller 255. The host system controller 255 may be an example of a hardware component while the application 215, file system 220, eMMC block driver 225, MFTL block driver 235, eMMC core driver 240, MFTL LLD driver 245, and controller driver 250 may be examples of firmware and/or software implemented using the controller 255 and/or other various components. The memory system 210 may include a memory system controller 260, eMMC firmware 265, MFTL eMMC firmware 270, memory device 230 (e.g., memory device 130 as described with reference to FIG. 1), which may include a memory device controller 217 (e.g., memory system controller 115 as described with reference to FIG. 1), and a bus 290. The memory system controller 260, memory device controller 217, and memory device 230 may be hardware components while eMMC firmware 265 and MFTL eMMC firmware 270 may be firmware blocks. The memory device 230 may also include eMMC managed memory 275 and MFTL eMMC managed memory 280.

Application 215 may be configured to store the software and/or operating system of the host system 205. In some examples, application 215 may be a program executed by the host system 205. Application 215 may communicate with the file system 220. The file system 220 may be configured to store data and/or files for the host system 205. The file system 220 may include a directory that catalogues and organizes the data and/or files stored. The file system 220 may be configured to communicate with the eMMC block driver 225 and the MFTL (managed flash translation layer) block driver 235.

The eMMC block driver 225 may be configured to support the file system 220 for reading and writing (e.g., programming) with the memory system controller 260 (e.g., the eMMC controller). The eMMC block driver 225 may be located in a logical block unit of the host system 205. The eMMC block driver 225 may be configured to communicate commands to the eMMC core driver 240. The eMMC core driver 240 may be configured to convert the commands received from the eMMC block driver 225 into an eMMC protocol command and payload. The eMMC core driver may utilize the eMMC protocol to communicate with the memory system 210. In some examples, the eMMC core driver 240 may receive commands from the MFTL LLD driver 245 and communicate those commands to the controller driver 250.

The MFTL block driver 235 may be configured to support the file system 220 for reading and writing (e.g., programming) with the memory system 210. The MFTL block driver 235 may be configured to generate a page address (e.g., physical memory address) that may be associated with a page from multiple logical units (LUNs) in the memory system or a page from multiple planes in the memory device. The MFTL block driver 235 may be located in a logical block unit of the host system 205. In some examples, the MFTL block driver 235 may be configured to output commands to the MFTL LLD (low level driver) 245. In some examples, the MFTL block driver 235 may configure itself based on receiving information from the memory system 210 to communicate with the memory system 210. For example, the MFTL block driver 235 may configure itself after reviving open NAND flash interface (ONFI) data (e.g., physical attributes of the memory, ECC requirements, timing, geometry, etc.) from the memory system 210. In some examples, the MFTL block driver 235 may also be configured to translate a logical memory address received from the file system 220 into a physical memory address that may utilized by the memory system 210 to access the memory in memory device 230. In some examples, the eMMC block driver 225 (and associated blocks) and the MFTL block driver 235 (and associated blocks) may represent alternative procedures for managing access operations with the memory systems. The eMMC block driver 225 may be used during a first mode of operation that uses procedures associated with eMMC systems and the MFTL block driver 235 may be used during a second mode of operation that uses procedures associated with managed NAND, but implemented on an eMMC system.

The MFTL LLD driver 245 may be configured to convert the commands received from the MFTL block driver 235 into a protocol that may be used to communicate with the memory system 210 over the bus 285. For example, the MFTL LLD driver 245 may convert the commands received in the MFTL protocol to an MFTL eMMC protocol that may be sent to the eMMC core driver 240. Once received by the eMMC core driver 240, the host system 205 may use eMMC related procedures to communicate the data, even though the commands and information were processed using translation techniques associated with the MFTL block driver 235. The MFTL LLD driver 245 may also be configured to provide an application programing interface (API) for the MFTL block driver 235 so that the MFTL block driver 235 may communicate with the memory system 210.

The controller driver 250 may be configured to output and receive data with the host system controller 255. The host system controller 255 may be configured to communicate commands with the memory system 210 and the memory system controller 260. In some examples, the host system controller 255 may be configured to initiate access operations (e.g., a read operation, write or program operation, erase operation, refresh operation, etc.) at the memory system 210.

Bus 285 may be configured to communicate requests, commands, and data between host system 205 and memory system 210. For example, the bus 285 may communicate data to be stored at or read from the memory system 210. The bus 285 may also be configured to communicate firmware statuses (e.g., whether a command was successfully executed at the memory system 210) from the memory system 210 to the host system 205. If a command is processed using the eMMC block driver 225, the address communicated over the bus 285 may be a logical address associated with the host system 205. If a command is processed using the MFTL block driver 235, the address communicated over the bus 285 may be a physical address associated with the memory system 210.

The memory system controller 260 may be configured to support communications between the host system controller 255 and the memory system 210. That is, the memory system controller 260 may support communications between the memory device controller 217 (e.g., controller for a NAND device) and the host system controller 255. In some examples, the memory system controller 260 may be an eMMC interface. In some cases, the memory system controller 260 may be configured to support eMMC protocol and MFTL eMMC protocol communications. The memory system controller 260 may be an example of the memory system controller 115 described with reference to FIG. 1. The memory device controller 217 may be an example of the local controller 135 described with reference to FIG. 1.

The eMMC firmware 265 may be configured to manage a portion of memory cells in the memory system 210 (e.g., the eMMC managed memory 275). That is, eMMC managed memory 275 in memory device 230 may be configured to store data or read data out using the eMMC protocol to communicate. eMMC firmware 265 may include firmware and data to manage eMMC managed memory 275. In some examples, the eMMC firmware 265 may be configured to receive commands from the host system associated with the eMMC protocol and communicate those commands to the memory device controller 217. In some cases, the eMMC managed memory 275 and the MFTL eMMC managed memory 280 may represent logical portions of a physical memory array(s) (e.g., NAND arrays). In such cases, a single memory dic (e.g., NAND die) may include eMMC managed memory 275 and MFTL eMMC managed memory 280. In some cases, the eMMC managed memory 275 and the MFTL eMMC managed memory 280 may represent physical partitions of memory or different memory array(s).

MFTL eMMC firmware 270 may be configured to manage a portion of memory cells in the memory system 210 (e.g., the MFTL eMMC managed memory 280). That is, MFTL eMMC managed memory 280 in memory device 230 may be configured to store data or read data out using the MFTL eMMC protocol to communicate. MFTL eMMC firmware 270 may include firmware and data to manage the MFTL eMMC managed memory 280. In some examples, the MFTL eMMC firmware 270 may receive commands from the host system associated with the MFTL eMMC protocol and communicate those commands to the memory device controller 217 of the memory device 230. In some cases, the MFTL eMMC firmware 270 may be implemented as part of the eMMC firmware 265. In some cases, MFTL eMMC firmware 270 may be implemented independently of the eMMC firmware 265.

Memory device controller 217 may be configured to manage data of the memory device 230 and operations performed by the memory device 230. Memory device controller 217 may be configured to receive commands from the host system 205. Memory device controller 217 may also be configured to perform host-initiated operations (e.g., a read operation, write or program operation, erase operation, refresh operation, etc.) based on received commands. In some examples, memory device controller 217 may also be configured to perform memory device-initiated operations (e.g., wear leveling, bad block management, ECC, etc.) on the memory device 230.

Bus 290 may be configured communicate commands and data within the memory device 230. In some examples, bus 290 may also communicate data between memory device controller 217 and memory device 230. In some examples, the bus 290 may transfer ONFI data.

In some examples, other different memory systems (e.g., raw NAND devices) may include only the application 215, the file system 220, MFTL block driver 235 and the MFTL LLD driver 245 in the host system and the memory device 230 in the memory system 210. In such memory systems 210, the random input/output performance and the total bytes written may be relatively high compared with another different memory system (e.g., eMMC memory system 210). That is, a host system controller 255 may have a relatively large storage capacity as compared with a memory device controller 217 of an eMMC memory system 210 and may be able to perform logical to physical address translations quicker. As the memory system has no controller, in these examples the host system controller 255 may perform operations (e.g., wear leveling, bad block management, ECC, translation, etc.). That is, the host system 205 may implement additional resources to manage the memory device 230. In some examples, developing the capabilities to perform the operations at the host system 205 may increase design processes and cause an increased time-to-market for the system 200.

In other examples, another different memory system (e.g., an eMMC memory system) may include only the application 215, file system 220, eMMC block driver 225, eMMC core driver 240, controller driver 250, and host system controller 255 in the host system and the memory system controller 260, eMMC firmware 265, and the memory device 230. In such examples, the memory device controller 217 may perform operations (e.g., wear leveling, bad block management, ECC, translation, etc.). As the memory system 210 includes a controller, the host system 205 may utilize less resources. Additionally or alternatively, the flash memory (e.g., memory device 230), flash controller (e.g., memory device controller 217), and eMMC controller (e.g., memory system controller 260) may be on the same die may enable the eMMC memory system 210 to be implemented in a wide variety of host systems 205. That is, the developmental cost associated with the design of the memory system 210 may be lower and it may be quicker in time-to-market. In eMMC memory systems 210, the memory device controller 217 may perform the logical to physical address translation. The memory device controller 217 may have a relatively small storage capacity and as such, may take longer to perform the translation than a host system controller 255.

The system 200 may include a host system 205 that is configured to perform the logical to physical memory address translations and coupled to a memory system 210 that is an example of an embedded memory system. That is, the host system 205 may communicate with the memory system 210 using either eMMC or MFTL eMMC protocol. Using the MFTL eMMC protocol may enable the memory system controller to utilize less SRAM to store operating code as the logical to physical memory address translation may occur at the host system. Additionally or alternatively, the MFTL eMMC protocol may more efficiently manage the memory cells in memory device 230 and cause the total bytes written (TBW) of the memory cells to increase. The operation parameters of the memory cells managed by the MFTL eMMC protocol may be the same as those of the memory cells managed by the eMMC protocol. The host system 205 may also utilize less resources and the overall performance and throughput of system 200 may increase. In some cases, the MFTL eMMC protocol may improve write amplification of the system. By using the host system 205 to perform the logical to physical memory address translations, access speeds of a memory system may be improved without changing the hardware of the memory system. In some cases, existing memory systems (such as eMMC systems) may be improved using these techniques without changing hardware or other physical features and instead is accomplished by modifying firmware or software.

In some examples, the memory system 210 may initially boot as an eMMC memory system 210. That is, memory system 210 may initially be configured to communicate using the eMMC protocol. When using the eMMC protocol, the eMMC block driver 225 may receive information from the file system 220, output it to the eMMC core driver 240. The eMMC core driver 240 may convert the information into commands associated with the eMMC protocol and output the information to the controller driver 250. The controller driver 250 may output the information to the host system controller 255. The host system controller 255 may communicate the commands over the bus 285 and memory system controller 260 to the eMMC firmware 265. The eMMC firmware 265 may provide the management information and the commands to the memory device controller 217 which may then access the eMMC managed memory 275.

In some examples, the host system 205 may output an initialization command to the memory system 210 to configure the memory system to utilize the MFTL eMMC protocol. For example, the MFTL block driver 235 may receive information from the file system 220 and output the information to the MFTL LLD driver 245. The MFTL LLD driver 245 may convert the command received from the MFTL block driver 235 into a command associated with the MFTL eMMC protocol. The MFTL LLD driver 245 may output the command to the eMMC core driver 240, and the command may be received at the MFTL eMMC firmware 270 through the controller driver 250, host system controller 255, the bus 285, and the memory system controller 260. The MFTL eMMC firmware 270 may output the command and the management information to the memory device controller 217. The memory device controller 217 may communicate with the memory device 230 and receive the information requested by the host system 205. Upon receiving the requested information, the MFTL block driver 235 may configure itself to utilize the MFTL eMMC protocol to communicate with the MFTL eMMC managed memory 280.

In some examples, additional commands may be communicated between the MFTL block driver 235 and the MFTL eMMC managed memory 280. The MFTL LLD driver 245 may convert the additional commands from the MFTL protocol to the MFTL eMMC protocol before they are communicated with the MFTL eMMC managed memory 280. In some examples, the MFTL block driver 235 may issue a start page program command that may be utilized to program data into a page in the MFTL eMMC managed memory 280. In other examples, the MFTL block driver 235 may issue a start page read command to read data from a main memory in the MFTL eMMC managed memory 280 to a cache memory in MFTL eMMC managed memory 280. In some cases, the MFTL LLD driver 245 may issue a block erase command to erase data from a block in MFTL eMMC managed memory 280. In other cases, the MFTL LLD driver 245 may issue a complete page read command to verify the transfer of data to the cache from the main memory. In some instances, the MFTL block driver 235 may issue a wait device command to check if the memory system 210 is available for data transfer. In other instances, the MFTL block driver 235 may issue a wait device true command may be issued to check if memory device 230 is available for data transfer. In some examples, the MFTL block driver 235 may issue a spare data command to set an amount of data the host system 205 may utilize in the memory device 230. In other examples, the MFTL block driver 235 may issue an eMMC refresh command to refresh the eMMC boot partition. In some cases, the MFTL block driver 235 may issue a set 4k command to support 4k address data transfer over the bus 285. In some instances, the MFTL block driver 235 may issue a set CPR (cache page read) command to enable the cache at the memory device 230.

Figure 3:
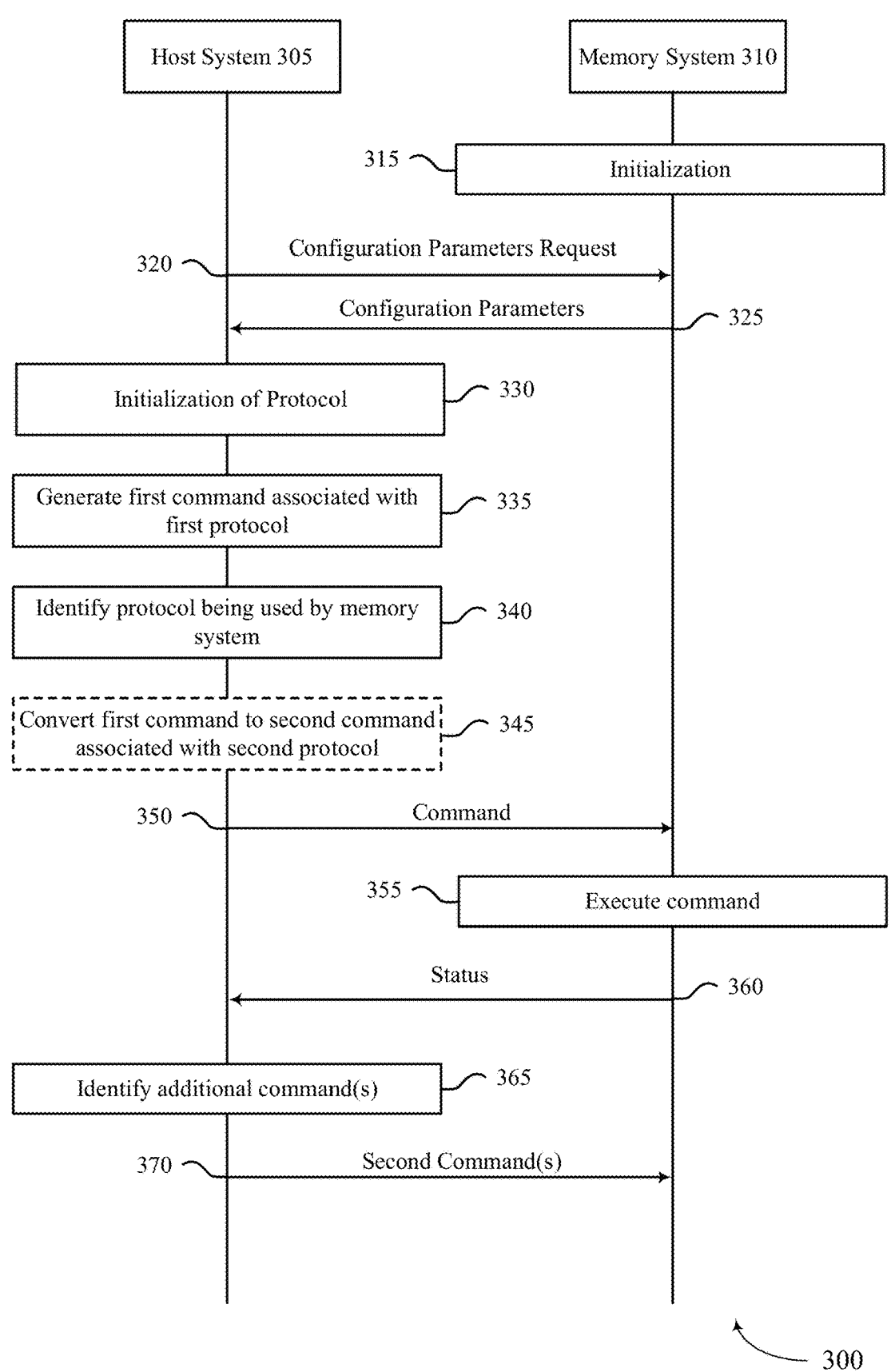
FIG. 3 illustrates an example of a diagram that supports techniques for managed NAND translation with embedded memory systems in accordance with examples as disclosed herein.

FIG. 3 illustrates an example of a diagram 300 that supports techniques for managed NAND translation with embedded memory systems in accordance with examples as disclosed herein. The diagram 300 may be performed by a system or its components as described herein. For example, the method of the diagram 300 illustrates techniques that may be performed by a system that includes a host system 305 and a memory system 310 as described with reference to FIGS. 1 and 2. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes may be used in every example. Other process flows are possible.

At 315, an initialization may occur. For example, the memory system 310 may initialize during a first boot procedure. The initialization may occur at the memory system controller (e.g., memory system controller 115). In some examples, a memory system 310 may perform the initialization when first coupled with a host system 305. The memory system 310 may initialize (e.g., boot) implementing a first protocol (e.g., an eMMC protocol). For example, if the memory system 310 is an example of an eMMC device, the memory system 310 may initialize using an eMMC protocol. In some examples, the parameters utilized during the initialization may be stored at eMMC managed memory (e.g., eMMC managed memory 275). For example, the eMMC managed memory may include firmware, boot partitions, replay protected memory block (RPMB) partition, and meta data.

At 320, configurations parameters request may be received. For example, the memory system 310 may receive the configuration parameters from the host system 305. The configuration parameters may be initiated by the block driver of the host system 305 (e.g., MFTL block driver 235) to the memory system controller though the MFTL LLD driver (e.g., MFTL LLD driver 245). The block driver may request a return code for the operation, a quantity of memory devices (e.g., memory device 130, 140), ONFI data, and a list of block ranges that are unavailable to utilize with a second protocol (e.g., MFTL eMMC protocol) different than the first protocol. In some examples, the configuration parameters request may be called an initialization command.

At 325, configuration parameters may be outputted. For example, the memory system 310 may output the configuration parameters requested to the host system 305. For example, memory system controller may retrieve the configuration parameters requested from memory (e.g., MFTL eMMC managed memory 280). The memory system controller may output the configuration parameters to the host system 305 (e.g., the MFTL block driver of the host system 305).

At 330, initialization of a protocol may occur. For example, the host system 305 may configure itself to communicate with the memory system 310 using the second protocol (e.g., MFTL eMMC protocol) based on the configuration parameters received. The configuration may occur at the MFTL block driver of the host system 305 (e.g., the MFTL block driver 235 and/or the MFTL LLD driver 245). After the host system 305 is configured, the host system 305 may support read and write (e.g., programming) operations for the memory system 310 by generating commands at the MFTL block driver and outputting them to the MFTL LLD driver which may convert them into the MFTL eMMC protocol.

At 335, a first command associated with the first protocol may be generated. For example, the host system 305 may generate a read command, a write command, or other command to be performed using the memory system 310. After the initialization, the memory system 310 may be configured to operate using the first protocol (e.g., eMMC protocol or a standard protocol associated with the memory system 310) or the second protocol (e.g., the MFTL eMMC protocol or an updated protocol not initially associated with the memory system 310). In some cases, the first command may be generated by the application 215, file system 220, or both described with reference to FIG. 2.

At 340, a protocol being used by the memory system 310 may be identified. For example, if the memory system 310 is using the first protocol, the host system 305 may transmit the first command to the memory system 310 (e.g., over the bus 285). In such examples, the eMMC block driver 225 described with reference to FIG. 2 may be used to generate and communicate the first command. In other examples, however, if the memory system is using the second protocol (e.g., MFTL protocol), the first command may be converted to a second command that uses the second protocol at 345. In such examples, the MFTL block driver 235 and the MFTL LLD driver 245 described with reference to FIG. 2 may be used to generate and communicate the second command. The conversion of the first command to the second command may include the host system 305 identifying a physical address of the memory system 310 based on the logical block address included in the first command. In such cases, the host system 305 may be configured to perform the logical-to-physical address translation when using the second protocol. In contrast, the memory system 310 may be configured to perform the logical-to-physical address translation when using the first protocol. Latency for performing commands may be reduced using the second protocol because of the computation resources available to the host system 305 to perform the logical-to-physical address translation, as compared with the computation resources available to the memory system 310. Additionally, a memory system 310 may be configured to operate using either the first protocol or the second protocol, thereby allowing the memory system 310 to be flexible for different applications.

At 350, a command (whether the first command or the second command described above) may be received. For example, a memory system 310 may receive a first command from the host system 305. In some examples, the host system 305 may output the command according to the eMMC protocol (e.g., the first command). In other examples, the host system 305 may output the command according to the MFTL eMMC protocol (e.g., the second command). In such instances, the command may be associated with a logical memory address to a physical memory address translation performed at the host system 305. In some cases, the host system 205 may generate the command to indicate the type of operation to perform (e.g., page read, page program, block erase, set CPR, set 4K, wait device, wait device true, complete page read, set spare, refresh boot, etc.). In some instances, the host may generate a sub-command indicating the payload of the command (e.g., the size of the command) and the physical location. That is, the memory device may have multiple LUNs (e.g., dies) consisting of multiple planes and pages and the sub-command may indicate a single plane access, a multi-plane access, or a single plane plus cache access across the multiple LUNs.

At 355, the command may be executed. For example, the memory system 310 may execute the operation associated with the command that was received. In some examples, when the command is associated with the eMMC protocol, the memory system controller may access eMMC managed memory (e.g., eMMC managed memory 275 as described with reference to FIG. 2). In other examples, when the command is associated with the MFTL eMMC protocol, the memory system controller may access MFTL eMMC managed memory (e.g., MFTL eMMC managed memory 280 as described with reference to FIG. 2).

At 360, a status may be outputted. For example, the memory system 310 may output the status to the host system 305. In some examples, the status may indicate whether the operation associated with the command was successful. For example, the memory system 310 may indicate that a page program operation was successful if data was stored at the memory device during the page program operation.

At 365, one or more additional commands associated with the second protocol (e.g., the MFTL eMMC protocol) may be identified. Given the differences between the first protocol and the second protocol, the second protocol may support one or more different or modified commands, as compared with the commands of the first protocol. The command set of the second protocol may include a plurality of commands, including the following: an initialize command, a start programming command, a complete programming command, a start read command, a complete read command, a wait device command, a wait device true command, a set spare command, a refresh boot command, a set 4k command, and/or a set cache page read command. In some cases, some operations, such as a read operation, may be performed using two commands: a start command and a complete command. Splitting some operations, such as the program operation or the read operation into two commands may allow the memory system to improve data throughput. In this manner, while the memory system is performing the first command of an operation, the memory system may receive other commands or perform other commands in parallel or both. The two command structure of the second protocol may further improve the latency of the memory system for performing an operation.

At 370, the one or more commands (whether the first command or the second command of an operation) may be received. After receiving the one or more commands, the memory system 310 may execute the one or more commands and may transmit a status, as described above.

Figure 4:
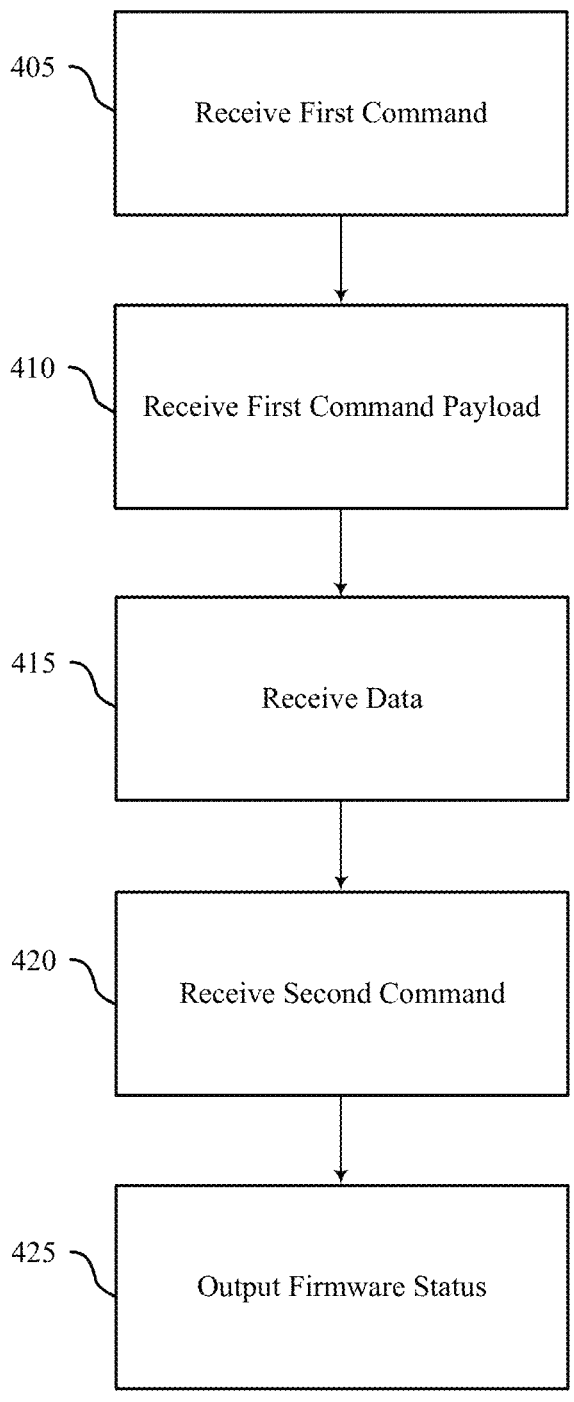
FIG. 4 illustrates an example of a diagram that supports techniques for managed NAND translation with embedded memory systems in accordance with examples as disclosed herein.

FIG. 4 illustrates an example of a diagram 400 that supports techniques for managed NAND translation with embedded memory systems in accordance with examples as disclosed herein. Diagram 400 may be performed by a system or its components as described herein. For example, the method of the diagram 400 may be performed by a system with reference to FIG. 1 and FIG. 2. The diagram 400 may be performed by a host system 205 and a memory system 210. Diagram 400 may be an example of a page program operation.

At 405 a first command may be received. For example, a memory system (e.g., memory system 210) may receive the first command from the host system (e.g., host system 205). The first command may be translated from a logical memory address to a physical memory address by the MFTL block driver (e.g., MFTL block driver 235) before being converted to be communicated using the MFTL eMMC protocol by the MFTL LLD driver (e.g., MFTL LLD driver 245). The host system may generate and output the command to initiate a page program operation.

At 410 a first command payload may be received. For example, a memory system may receive the first command payload from the host system. That is, the first command may also include a sub-command (e.g., the first command payload) for programming purposes. In some examples, the host system may generate the first command payload to indicate the payload and the type of access to be performed. That is, the memory device may have multiple LUNs (e.g., dies) consisting of multiple planes and pages and the first command payload may indicate a single plane access, a multi-plane access, or a single plane plus cache access across the multiple LUNs. In this example, the first command payload may indicate a single page program operation.

At 415, data may be received. For example, a memory system may receive data to program to a page from the host system. In some examples, the memory system may receive the data in 4k byte increments. That is, the host system may output a first increment containing 4k bytes of data, a second increment containing an additional 4k bytes of data, and so forth. In some examples, prior to receiving first command, the memory system may receive a set 4k command to enable the 4k byte data transfer increments. That is, the host system may enable the bus (e.g., bus 285) to transfer the data in 4k byte increments before the first command is generated. The memory system may store the data in the memory address associated with the first command. That is, the data may be stored at the MFTL eMMC managed memory (e.g., MFTL eMMC managed memory 280). In some examples, the host system may also output spare data.

At 420, a second command may be received. For example, the memory system may receive the second command from the host system. In some examples, the host system may generate the second command to request the firmware status of the memory system after the first command was received and executed at the memory system.

At 425, the status of the firmware may be outputted. For example, a memory system may output the firmware status to the host system. In some examples, the memory system may output the firmware status in a 512-byte indication. In some instances, the first byte (e.g., byte zero (0)) may indicate whether the page program operation was successful. The next three bytes (e.g., bytes one (1), two (2), three (3)) may be reserved. Additionally, the next quantity of bytes may indicate the respective 4k byte increments received. For example, bytes four (4) through seven (7) may have a value "0×00" when four (4) 4k byte increments are received. The remaining bytes (e.g., bytes eight (8) through 512) may be reserved.

Figure 5:
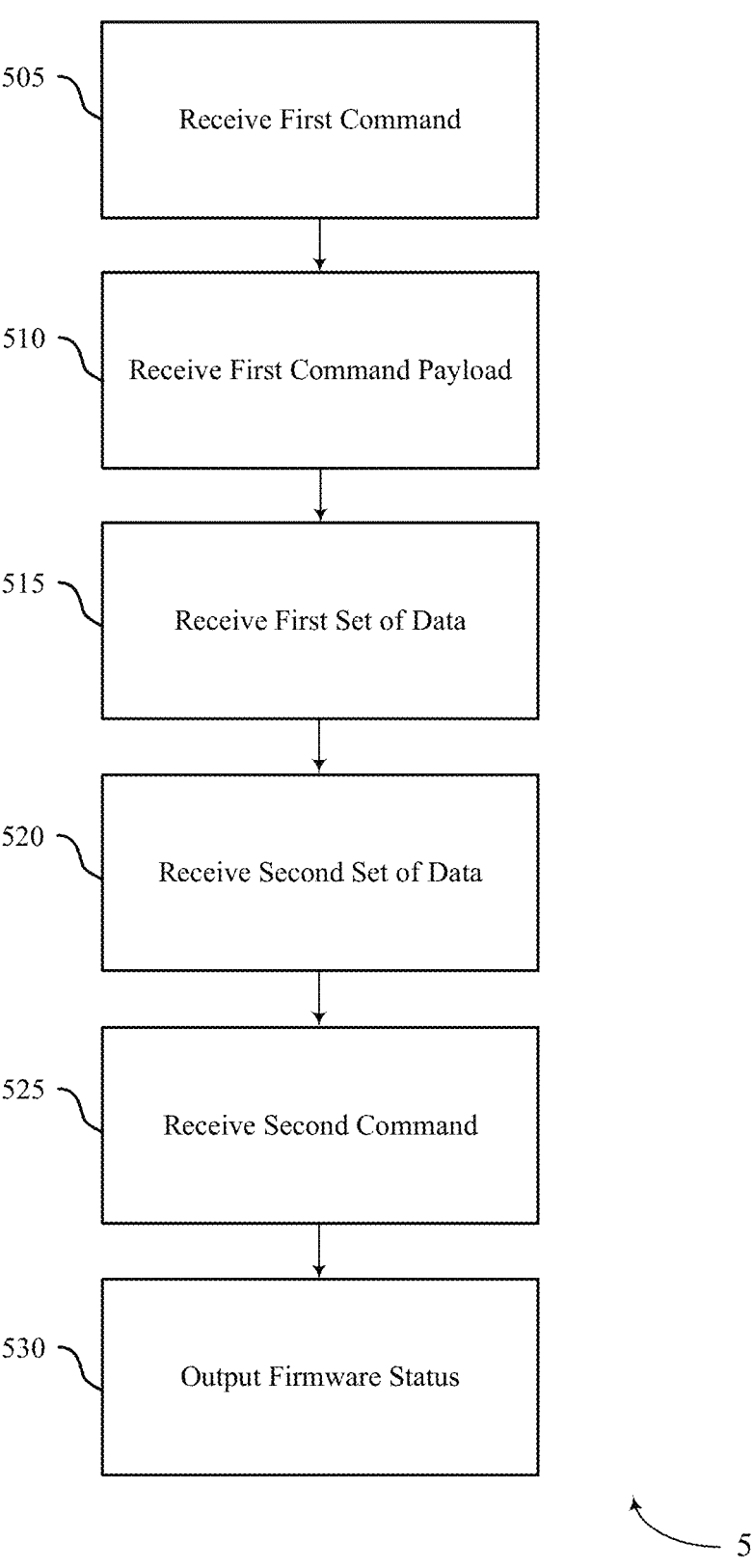
FIG. 5 illustrates an example of a diagram that supports techniques for managed NAND translation with embedded memory systems in accordance with examples as disclosed herein.

FIG. 5 illustrates an example of a diagram 500 that supports techniques for managed NAND translation with embedded memory systems in accordance with examples as disclosed herein. Diagram 500 may be performed by a system or its components as described herein. For example, the method of the diagram 500 may be performed by a system with reference to FIG. 1 and FIG. 2. The diagram 500 may be performed by a host system 205 and a memory system 210. Diagram 500 may be an example of a multi-page program operation.

At 505, a first command may be received. For example, a memory system (e.g., memory system 210) may receive the first command from the host system (e.g., host system 205). The first command may be translated from a logical memory address to a physical memory address by the MFTL block driver (e.g., MFTL block driver 235) before being converted to be communicated by MFTL eMMC protocol by the MFTL LLD driver (e.g., MFTL LLD driver 245). The host system may generate and output the command to initiate a multi-page program operation.

At 510, a first command payload may be received. For example, the memory system may receive the first command payload from the host system. The host system may generate the first command payload to indicate the type of access to be performed. In this example, the first command payload may indicate a multi-page operation (e.g., or a multi-plane page operation).

At 515, a first set of data may be received. For example, a memory system may receive the first set of data from the host system. In some examples, the host system may output data in sets according to quantity of respective pages the data is going to be stored at. That is, the first set of data may correspond to first page (or plane) that the data will be stored at in the memory device. The host system may output the first set of data in 4k byte increments.

At 520, a second set of data may be received. For example, a memory system may receive the second set of data from the host system. The second set of data may correspond to a second page (or plane) that the data will be stored at in the memory device. The host system may output the second set of data in 4k byte increments. In some examples, either the first set of data or the second set of data may include spare data. That is, in some cases before the host system outputs the first command, the host system may output a set spare command. In such examples, the host system may indicate a size of data to utilize in memory cells different than the MFTL eMMC managed memory (e.g., MFTL eMMC managed memory 280). The host system may keep the spare data size the same after setting it. In some examples, the host system may program data to the spare data portion of the memory device. In some examples, the MFTL eMMC managed memory (e.g., MFTL eMMC managed memory 280) may store the first and second set of data.

At 520, a second command may be received. For example, a memory system may receive the second command from the host system. In some examples, host system may generate the second command to request the firmware status of the memory system after the first command was received and executed at the memory system.

At 525, the status of the firmware may be outputted. For example, a memory system may output the firmware status to the host system. In some examples, the memory system may output the firmware status in a 512-byte indication. In some instances, the first byte (e.g., byte zero (0)) may indicate whether the page program operation was successful. The next three bytes (e.g., bytes one (1), two (2), three (3)) may be reserved. Additionally, the memory system may utilize the next quantity of bytes to indicate the respective 4k byte increments received. For example, a host system may output eight (8) 4k byte increment to the memory device. If the host system receives a firmware status that has bytes four (4) through seven (7) with a value "0×00" and the remaining bytes having a reserved value, then the operation may have failed. That is, as eight (8) 4k bytes were outputted but four (4) were indicated as received, 4k byte increments five (5) through eight (8) may not have been stored at the memory system. In some examples, the host system may try outputting the data not received again.

Figure 6:
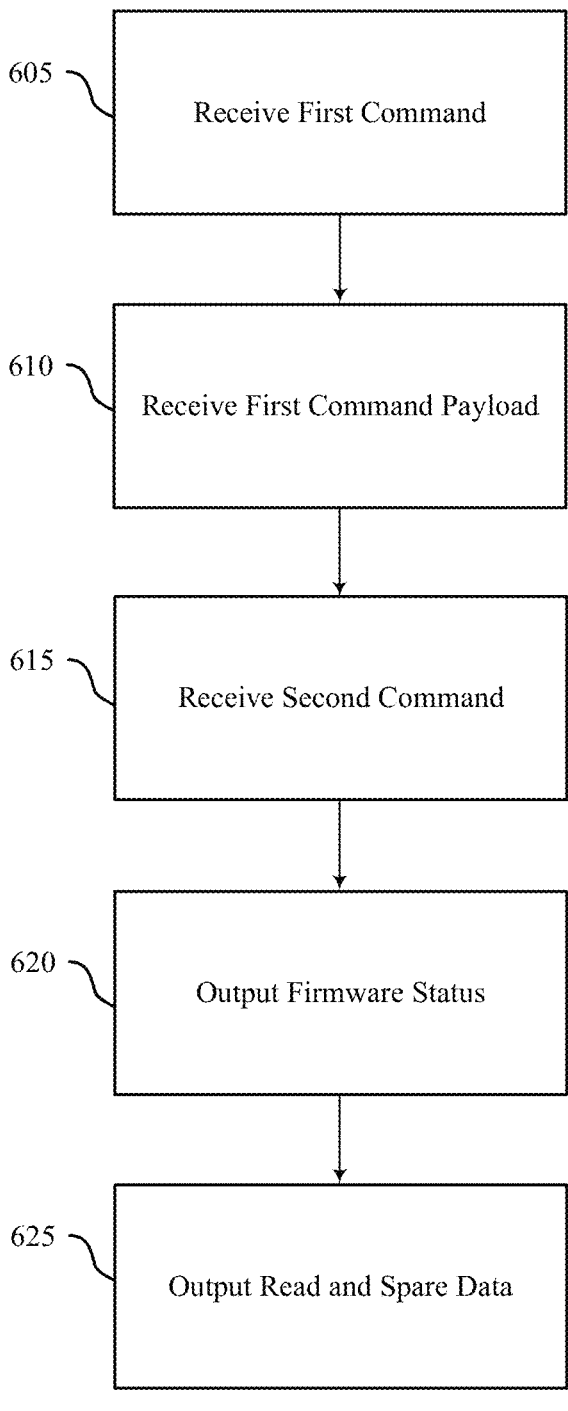
FIG. 6 illustrates an example of a diagram that supports techniques for managed NAND translation with embedded memory systems in accordance with examples as disclosed herein.

FIG. 6 illustrates an example of a diagram 600 that supports techniques for managed NAND translation with embedded memory systems in accordance with examples as disclosed herein. Diagram 600 may be performed by a system or its components as described herein. For example, the method of the diagram 600 may be performed by a system with reference to FIG. 1 and FIG. 2. The diagram 600 may be performed by a host system 205 and a memory system 210. Diagram 600 may be an example of a single page read operation.

At 605, a first command may be received. For example, a memory system (e.g., memory system 210) may receive the first command from the host system (e.g., host system 205). In some examples, the MFTL block driver (e.g., MFTL block driver 235) may translate the first command from a logical memory address to a physical memory address by before the command is converted to be communicated by MFTL eMMC protocol by the MFTL LLD driver (e.g., MFTL LLD driver 245). The host system may generate and output the command to initiate a single page read operation. In some examples, before outputting the first command, the host system may output a wait device command to the memory system. In response to receiving the wait device command, the memory system may set a value to a bit located in a status register associated with the physical memory address received from the host system. In some examples, the memory system may set a value one (1) for the bit to indicate the memory system is available to transfer data. In other examples, the memory system may set a value zero (0) to indicate the memory system is unavailable for data transfer. The host system may wait to output the first command until the value of the bit is at one (1).

In other examples, the host system may output a wait device true command to the memory device (e.g., a memory array) before outputting the first command. In response to receiving the wait device true command, the memory device may set a value to a bit located in a status register associated with the physical memory address received from the host system. In some examples, the memory device may set a value one (1) for the bit to indicate the memory device is available to transfer data. In other examples, the memory device may set a value zero (0) to indicate the memory device is unavailable for data transfer. The host system may wait to output the first command until the value of the bit is at one (1).

At 610, a first command payload may be received. For example, a memory system may receive the first command payload from the host system. The host system may generate the first command payload to indicate the type of access to be performed. In this example, the first command payload may indicate a single page read operation.

At 615, a second command may be received. For example, a memory system may receive the second command from the host system. In some examples, host system may generate the second command to request the firmware status of the memory system after the first command was received at the memory system.

At 620, the status of the firmware may be outputted. For example, a memory system may output the firmware status to the host system. In some examples, the memory system may output the firmware status in a 512-byte indication. In some instances, the first byte (e.g., byte zero (0)) may indicate whether the page program operation was successful. The next three bytes (e.g., bytes one (1), two (2), three (3)) may be reserved. Additionally, the memory system may utilize the next quantity of bytes to indicate the respective 4k byte increments to be read out. For example, bytes four (4) through seven (7) may have a value "0×00" when four (4) 4k byte increments are to be read from the memory system. The remaining bytes may be reserved.

At 625, read and spare data may be outputted. For example, a memory system may output read and spare data to the host system. In some cases, the memory system may output the read and spare data associated with the physical memory address of the first command.

Figure 7:
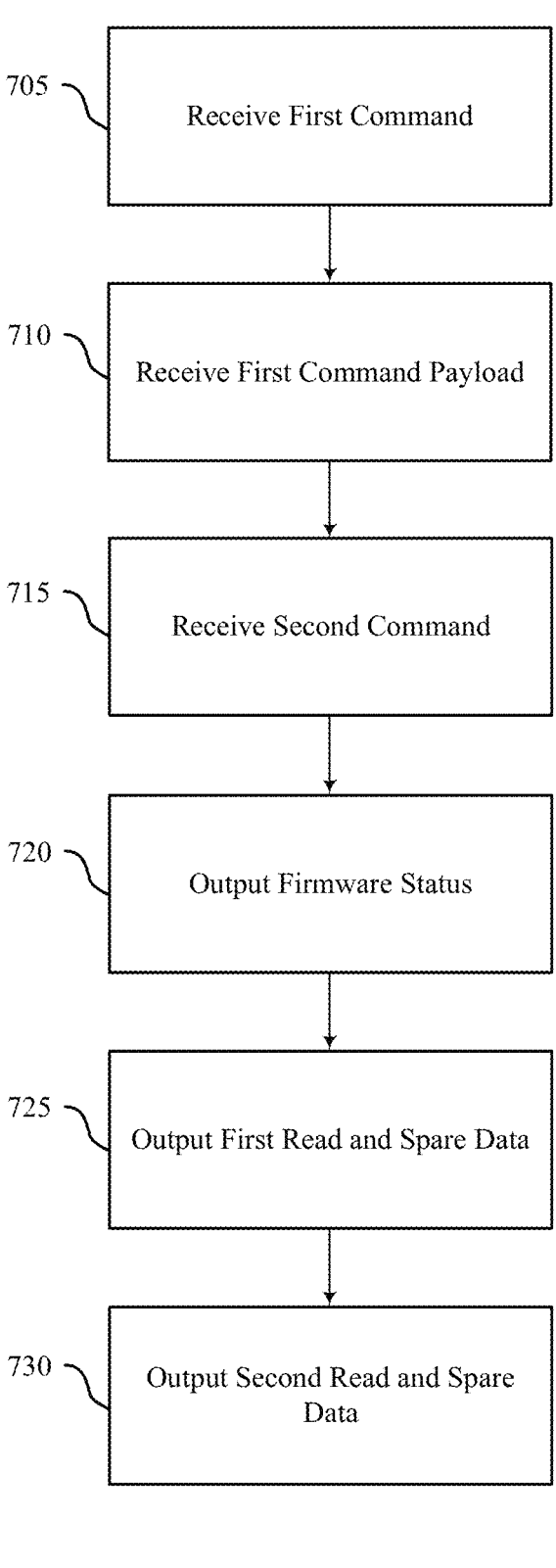
FIG. 7 illustrates an example of a diagram that supports techniques for managed NAND translation with embedded memory systems in accordance with examples as disclosed herein.

FIG. 7 illustrates an example of a diagram 700 that supports techniques for managed NAND translation with embedded memory systems in accordance with examples as disclosed herein. Diagram 700 may be performed by a system or its components as described herein. For example, the method of the diagram 700 may be performed by a system with reference to FIG. 1 and FIG. 2. The diagram 700 may be performed by a host system 205 and a memory system 210. Diagram 700 may be an example of a multi-page (e.g., multi-plane) read operation.

At 705, a first command may be received. For example, a memory system (e.g., memory system 210) may receive the first command from the host system (e.g., host system 205). In some examples, the MFTL block driver (e.g., MFTL block driver 235) may translate the first command from a logical memory address to a physical memory address by before the command is converted to be communicated by MFTL eMMC protocol by the MFTL LLD driver (e.g., MFTL LLD driver 245). The host system may generate and output the first command to initiate a multi-page read operation.

At 710, a first command payload may be received. For example, a memory system may receive the first command payload from the host system. The host system may generate the first command payload to indicate the type of access to be performed. In this example, the first command payload may indicate a multi-page (e.g., multi-plane) read operation.

At 715, a second command may be received. For example, a memory system may receive the second command from the host system. In some examples, host system may generate the second command to request the firmware status of the memory system after the first command was received at the memory system.

At 720, a status of the firmware may be outputted. For example, a memory system may output the firmware status to the host system. In some examples, the memory system may output the firmware status in a 512-byte indication. In some instances, the first byte (e.g., byte zero (0)) may indicate whether the page program operation was successful. In other examples, the memory system may generate the first byte to indicate a type of read to be performed. For example, when the first byte has a value "0×01", the read that occurs may be a "uecc" operation. That is, the memory system may read the data for ECC detection and correction process. The next three bytes (e.g., bytes one (1), two (2), three (3)) may be reserved. Additionally, the memory system may utilize the next quantity of bytes to indicate the respective 4k byte increments to be read out. For example, bytes four (4) through seven (7) may have a value "0×00" when four (4) 4k byte increments are to be read from the memory system. In examples where a multi-plane page is read, bytes eight (8) through eleven (11) may have a value "0×00" as well. The remaining bytes may be reserved.

At 725, first read and spare data may be outputted. For example, a memory system may output the first read and spare data to the host system. In some cases, the memory system may output the first read and spare data associated with the physical memory address of the memory system. That is, the first read and spare data may be associated with a first plane of the memory system.

At 730, second read and spare data may be outputted. For example, a memory system may output the second read and spare data to the host system. In some cases, the memory system may output the second read and spare data associated with the physical memory address of the memory system. That is, the second read and spare data may be associated with a second plane of the memory system.

In some examples, the memory system may transfer the first and second read data to a cache memory in the memory system rather than output the first and second data to the host system. This may be performed as part of a read ahead operation (e.g., the memory system may be able to output the first and second data to the host faster via the cache in subsequent read commands). In such examples, the memory system may receive a memory address, a first command start page read, a first command payload and information on whether the data read is from a main memory, a 4k main data flag, a 4k main data index or a spare data flag. The memory system may output a firmware status after the completion of the command. Additionally or alternatively, the memory system may receive a subsequent command complete page read to verify the transfer of the first and second data to the cache. The memory system may output a firmware status indicating where the data was read from (e.g., from the main memory, 4k main data flag, 4k main data index, or the spare data flag). The memory system may also verify the transfer by performing an ECC operation based on receiving the physical memory address of which plane the data was transferred from.

In other examples, the host system may output a CPR (cache page read) command. The memory system may receive the command and enable the cache memory upon receiving the command. The host system may enable the start page read and the complete page read commands.

In other cases, the host system may output a start block erase command. The host system may output a first command indicating the start block erase command and a physical page address, a first command payload indicating the type of access to perform. The memory system may execute the start block erase command and erase a block associated with the physical memory address received and output a firmware status. In other examples, the host system may output a refresh boot command. The memory system may refresh the boot partition associated with the eMMC protocol stored at an eMMC managed memory (e.g., eMMC managed memory 275) and output a firmware status.

Figure 8:
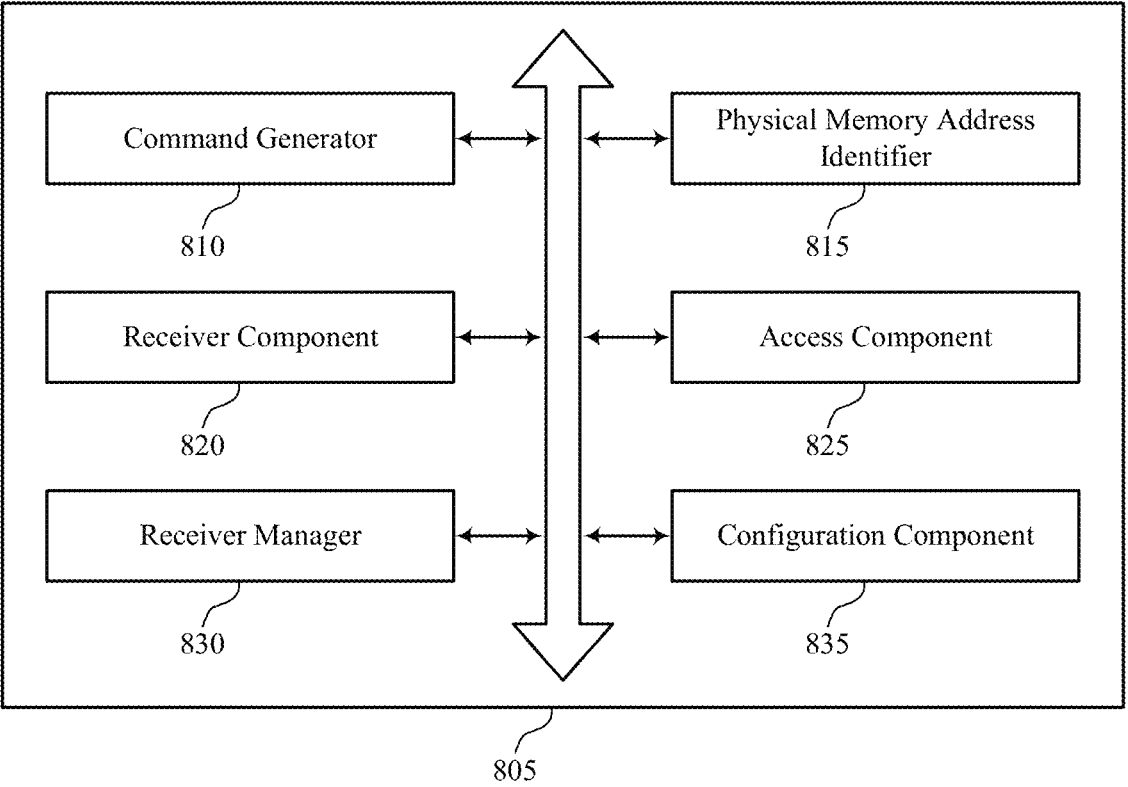
FIG. 8 shows a block diagram of a system that supports techniques for managed NAND translation with embedded memory systems in accordance with examples as disclosed herein.

FIG. 8 shows a block diagram 800 of a system 805 that supports techniques for managed NAND translation with embedded memory systems in accordance with examples as disclosed herein. The system 805 may be an example of aspects of a system as described with reference to FIGS. 1 and 2. The system 805 may include a command generator 810, a physical memory address identifier 815, a receiver component 820, an access component 825, a receiver manager 830, and a configuration component 835. Each of these modules may communicate, directly or indirectly, with one another (e.g., via one or more buses).

The command generator 810 may generate, at a host system, a first command to access a logical memory address associated with a memory system. In some examples, the command generator 810 may output, from the host system to the memory system, a second command and the physical memory address of the memory system based on generating the first command. In some cases, the command generator 810 may convert, at the host system, the first command that uses the second protocol to the second command that uses the protocol. In some instances, the command generator 810 may output an initialization command to the memory system. In some examples, the command generator 810 may generate, at the host system, a third command associated with the memory device and a second memory device from the set of memory devices. In some cases, the command generator 810 may output the third command to the memory system using the protocol.

In some instances, the command generator 810 may select, at the host system, a quantity of planes and the cache based on identifying the physical memory address. In some examples, the command generator 810 may output, from the host system to the memory system, a set of data associated with the physical memory address using the protocol. In some cases, the command generator 810 may generate, at the host system, a third command based on outputting the second command, and outputting the third command to the memory system. In some instances, the command generator 810 may erase data, at the memory system, from the memory cells based on receiving the second command, where the second command is an erase command. In some examples, the command generator 810 may generate, at the host system, a read command based on receiving the first bit. In some cases, the command generator 810 may output, from the host system, the read command to the memory system based on generating the read command.

In some instances, the command generator 810 may generate, at the host system, a read command based on receiving the first bit. In some examples, the command generator 810 may output, from the host system, the read command to the memory system based on generating the read command. In some cases, the command generator 810 may select, at the memory system, a size of data to utilize in a set of memory cells different than the memory cells at the memory system based on outputting the second command. In some instances, the command generator 810 may refreshing, at a portion that is associated with a second protocol in the memory system, memory cells in the portion based on receiving the second command. In some examples, the command generator 810 may enable a bus coupled with the host system and the memory system to transfer the physical memory address associated with the memory cells based at least in part on generating the second command. In some cases, the command generator 810 may enable a cache array at the memory system based on outputting the second command.

The physical memory address identifier 815 may identify, at the host system, a physical memory address of the memory system based on generating the first command.

The receiver component 820 may receive, at the memory system, the second command and the physical memory address, where the physical memory address is communicated using a protocol associated with a multi-media controller at the memory system. In some examples, the receiver component 820 may receive, at the memory system, the set of data. In some cases, the receiver component 820 may store, at the memory system, the set of data at the memory cells associated with the physical memory address, based on receiving the set of data. In some instances, the receiver component 820 may receive, at the memory system, the third command from the host system, and verifying the transfer of data from the first set of memory cells to the second set of memory cells.

The access component 825 may access, at the memory system, memory cells in a memory device associated with the physical memory address based on receiving the second command and the physical memory address. In some examples, the access component 825 may transfer, at the memory system, a set of data from a first set of memory cells of the memory cells associated with the physical memory address to a second set of memory cells of the memory cells associated with the physical memory address based on receiving the second command. In some cases, the access component 825 may generate, at the memory system, a first bit indicating whether a bus coupled with the host system and the memory system is available to transfer data based on receiving the second command. In some instances, the access component 825 may output, from the memory system, the first bit to the host system based on generating the first bit. In some examples, the access component 825 may generate, at the memory system, a first bit indicating whether a memory array associated with the memory cells at the memory device is available to receive a set of data based on receiving the second command. In some cases, the access component 825 may and outputting, from the memory system, the first bit to the host system based on generating the first bit. In some instances, the access component 825 may utilize, at the memory system, the protocol based on receiving the second command.

The receiver manager 830 may receive, from the memory system, a configuration parameter based on outputting the initialization command.

The configuration component 835 may configure the host system to access the memory cells in the memory device based on receiving the configuration parameter. In some examples, the configuration component 835 may initialize, at the memory system, a boot procedure and use a second protocol based on receiving the second command.

Figure 9:
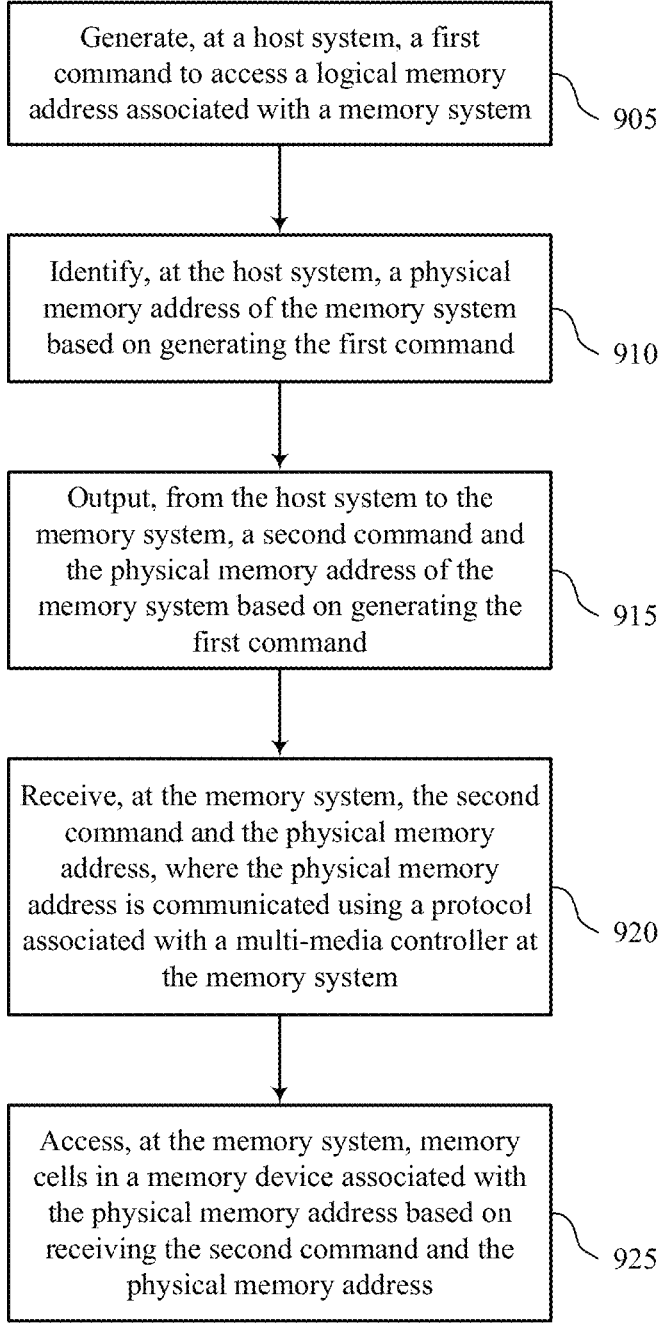
FIG. 9 shows a flowchart illustrating a method or methods that support techniques for managed NAND translation with embedded memory systems in accordance with examples as disclosed herein.

FIG. 9 shows a flowchart illustrating a method or methods 900 that supports techniques for managed NAND translation with embedded memory systems in accordance with examples as disclosed herein disclosure. The operations of method 900 may be implemented by a system or its components as described herein. For example, the operations of method 900 may be performed by a system as described with reference to FIG. 8. In some examples, a system may execute a set of instructions to control the functional elements of the system to perform the described functions. Additionally or alternatively, a system may perform aspects of the described functions using special-purpose hardware.

At 905, the system may generate, at a host system, a first command to access a logical memory address associated with a memory system. The operations of 905 may be performed according to the methods described herein. In some examples, aspects of the operations of 905 may be performed by a command generator as described with reference to FIG. 8.

At 910, the system may identify, at the host system, a physical memory address of the memory system based on generating the first command. The operations of 910 may be performed according to the methods described herein. In some examples, aspects of the operations of 910 may be performed by a physical memory address identifier as described with reference to FIG. 8.

At 915, the system may output, from the host system to the memory system, a second command and the physical memory address of the memory system based on generating the first command. The operations of 915 may be performed according to the methods described herein. In some examples, aspects of the operations of 915 may be performed by a command generator as described with reference to FIG. 8.

At 920, the system may receive, at the memory system, the second command and the physical memory address, where the physical memory address is communicated using a protocol associated with a multi-media controller at the memory system. The operations of 920 may be performed according to the methods described herein. In some examples, aspects of the operations of 920 may be performed by a receiver component as described with reference to FIG. 8.

At 925, the system may access, at the memory system, memory cells in a memory device associated with the physical memory address based on receiving the second command and the physical memory address. The operations of 925 may be performed according to the methods described herein. In some examples, aspects of the operations of 925 may be performed by an access component as described with reference to FIG. 8.

In some examples, an apparatus as described herein may perform a method or methods, such as the method 900. The apparatus may include features, means, or instructions (e.g., a non-transitory computer-readable medium storing instructions executable by a processor) for generating, at a host system, a first command to access a logical memory address associated with a memory system, identifying, at the host system, a physical memory address of the memory system based on generating the first command, outputting, from the host system to the memory system, a second command and the physical memory address of the memory system based on generating the first command, receiving, at the memory system, the second command and the physical memory address, where the physical memory address is communicated using a protocol associated with a multi-media controller at the memory system, and accessing, at the memory system, memory cells in a memory device associated with the physical memory address based on receiving the second command and the physical memory address.

In some examples of the method 900 and the apparatus described herein, the first command uses a second protocol different than the protocol, where generating the second command further may include operations, features, means, or instructions for converting, at the host system, the first command that uses the second protocol to the second command that uses the protocol.

In some cases of the method 900 and the apparatus described herein, the first command may be generated at a first driver of the host system, the second command may be converted at a second driver of the host system, and the second driver outputs the second command to a third driver configured to communicate with the memory system using the protocol.

In some instances of the method 900 and the apparatus described herein, the third driver may be a core driver associated with a second protocol at the host system or a firmware driver associated with the protocol at the memory system.

In some examples of the method 900 and the apparatus described herein, outputting the second command further may include operations, features, means, or instructions for outputting an initialization command to the memory system, receiving, from the memory system, a configuration parameter based on outputting the initialization command, and configuring the host system to access the memory cells in the memory device based on receiving the configuration parameter.

In some cases of the method 900 and the apparatus described herein, the memory system includes a set of memory cells that may be associated with the physical memory address, and the configuration parameter indicates the memory cells available to use the protocol.

In some instances of the method 900 and the apparatus described herein, the configuration parameter may be received at a first driver of the host system, and the first driver may be configured to access the memory cells in the memory device based on receiving the configuration parameter.

In some examples of the method 900 and the apparatus described herein, the memory system includes a set of memory devices, and the host system may be further configured to select the memory device from the set of memory devices based on generating the second command and identifying the physical memory address.

Some cases of the method 900 and the apparatus described herein may further include operations, features, means, or instructions for generating, at the host system, a third command associated with the memory device and a second memory device from the set of memory devices, and output the third command to the memory system using the protocol.

In some instances of the method 900 and the apparatus described herein, the memory device further includes a set of planes and a cache associated with the memory cells, and selecting, at the host system, a quantity of planes and the cache based on identifying the physical memory address.

Some examples of the method 900 and the apparatus described herein may further include operations, features, means, or instructions for outputting, from the host system to the memory system, a set of data associated with the physical memory address using the protocol, receiving, at the memory system, the set of data, and storing, at the memory system, the set of data at the memory cells associated with the physical memory address, based on receiving the set of data.

Some cases of the method 900 and the apparatus described herein may further include operations, features, means, or instructions for transferring, at the memory system, a set of data from a first set of memory cells of the memory cells associated with the physical memory address to a second set of memory cells of the memory cells associated with the physical memory address based on receiving the second command.

Some instances of the method 900 and the apparatus described herein may further include operations, features, means, or instructions for generating, at the host system, a third command based on outputting the second command, and outputting the third command to the memory system, and receiving, at the memory system, the third command from the host system, and verifying the transfer of data from the first set of memory cells to the second set of memory cells.

Some examples of the method 900 and the apparatus described herein may further include operations, features, means, or instructions for erasing data, at the memory system, from the memory cells based on receiving the second command, where the second command may be an erase command.

Some cases of the method 900 and the apparatus described herein may further include operations, features, means, or instructions for generating, at the memory system, a first bit indicating whether a bus coupled with the host system and the memory system may be available to transfer data based on receiving the second command, and outputting, from the memory system, the first bit to the host system based on generating the first bit.

Some instances of the method 900 and the apparatus described herein may further include operations, features, means, or instructions for generating, at the host system, a read command based on receiving the first bit, and outputting, from the host system, the read command to the memory system based on generating the read command.

Some examples of the method 900 and the apparatus described herein may further include operations, features, means, or instructions for generating, at the memory system, a first bit indicating whether a memory array associated with the memory cells at the memory device may be available to receive a set of data based on receiving the second command, and outputting, from the memory system, the first bit to the host system based on generating the first bit.

Some examples of the method 900 and the apparatus described herein may further include operations, features, means, or instructions for generating, at the host system, a read command based on receiving the first bit, and outputting, from the host system, the read command to the memory system based on generating the read command.

In some cases of the method 900 and the apparatus described herein, outputting the second command further may include operations, features, means, or instructions for selecting, at the memory system, a size of data to utilize in a set of memory cells different than the memory cells at the memory system based on outputting the second command.

Some instances of the method 900 and the apparatus described herein may further include operations, features, means, or instructions for refreshing, at a portion that may be associated with a second protocol in the memory system, memory cells in the portion based on receiving the second command.

Some examples of the method 900 and the apparatus described herein may further include operations, features, means, or instructions for enabling a bus coupled with the host system and the memory system to transfer the physical memory address associated with the memory cells based at least in part on generating the second command.

Some cases of the method 900 and the apparatus described herein may further include operations, features, means, or instructions for enabling a cache array at the memory system based on outputting the second command.

In some instances of the method 900 and the apparatus described herein, the memory system further includes an interface coupled with the host system.

Some examples of the method 900 and the apparatus described herein may further include operations, features, means, or instructions for initializing, at the memory system, a boot procedure and use a second protocol based on receiving the second command.

Some cases of the method 900 and the apparatus described herein may further include operations, features, means, or instructions for utilizing, at the memory system, the protocol based on receiving the second command.

In some instances of the method 900 and the apparatus described herein, the memory system may be embedded with a circuit of the host system and the controller may be a multi-media controller.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a host system configured to generate a first command to access a logical memory address associated with a memory system, identify a physical memory address of the memory system based on generating the first command, output a second command and the physical memory address based on identifying the physical memory address, the memory system including, a memory device, a controller coupled with the memory device and the host system, where the controller is configured to, receive the second command and the physical memory address from the host system, where the physical memory address is communicated using a protocol associated with the controller, and access memory cells in the memory device associated with the physical memory address based on receiving the second command and the physical memory address.

In some examples, the first command uses a second protocol different than the protocol, where generating the second command may include operations, features, means, or instructions for convert the first command that uses the second protocol to the second command that uses the protocol.

In some instances, the first command may be generated at a first driver of the host system, the second command may be converted at a second driver of the host system, and the second driver outputs the second command to a third driver configured to communicate with the memory system using the protocol.

In some cases, the third driver may be a core driver associated with a second protocol at the host system or a firmware driver associated with the protocol at the memory system.

In some examples, outputting the second command may include operations, features, means, or instructions for output an initialization command to the memory system, receive, from the memory system, a configuration parameter based on outputting the initialization command, and configure the host system to access the memory cells in the memory device based on receiving the configuration parameter.

In some instances, the memory system includes a set of memory cells that may be associated with the physical memory address, and the configuration parameter indicates the memory cells available to use the protocol.

In some cases, the configuration parameter may be received at a first driver of the host system, and the first driver may be configured to access the memory cells in the memory device based on receiving the configuration parameter.

In some examples, the memory system includes a set of memory devices, and the host system may be further configured to select the memory device from the set of memory devices based on generating the second command and identifying the physical memory address.

Some examples may further include generating a third command associated with the memory device and a second memory device from the set of memory devices, and output the third command to the memory system using the protocol.

In some cases, the memory device further includes a set of planes and a cache associated with the memory cells, and the host system may be further configured to select a quantity of planes and the cache based on identifying the physical memory address.

In some instances, the host system may be further configured to output, to the memory system, a set of data associated with the physical memory address using the protocol, and the controller may be further configured to receive the set of data, and store the set of data at the memory cells associated with the physical memory address, based at least in part on receiving the set of data.

In some examples, the controller may be further configured to transfer a set of data from a first set of memory cells of the memory cells associated with the physical memory address to a second set of memory cells of the memory cells associated with the physical memory address based on receiving the second command.

In some cases, the host system may be further configured to generate a third command based on outputting the second command, and output the third command to the memory system, and the controller may be further configured to receive the third command from the host system, and verify the transfer of data from the first set of memory cells to the second set of memory cells.

In some cases, the controller may be further configured to erase data from the memory cells based on receiving the second command, where the second command may be an erase command.

Some examples may further include generating a first bit indicating whether a bus coupled with the host system and the memory system may be available to transfer data based on receiving the second command, and output the first bit to the host system based on generating the first bit.

Some instances may further include generating a read command based on receiving the first bit, and output the read command to the memory system based on receiving the third command.

Some cases may further include generating a first bit indicating whether a memory array associated with the memory cells at the memory device may be available to receive a set of data based on receiving the second command, and output the first bit to the host system based on generating the first bit.

Some examples may further include generating a read command based on receiving the first bit, and output the read command to the memory system based on generating the read command.

In some instances, outputting the second command may include operations, features, means, or instructions for select a size of data to utilize in a set of memory cells different than the memory cells at the memory system based on outputting the second command.

In some examples, the memory system further may include operations, features, means, or instructions for refresh memory cells in the portion based on receiving the second command.

Some cases may further include enabling a bus coupled with the host system and the memory system to transfer the physical memory address associated with the memory cells based at least in part on generating the second command.

In some instances, the host system may be further configured to enable a cache array at the memory system based on outputting the second command.

In some examples, the memory system further includes an interface coupled with the host system and the memory device.

In some instances, the memory system may be further configured to initialize a boot procedure and use a second protocol based on receiving the second command.

In some cases, the memory system may be further configured to utilize the protocol based on receiving the second command.

In some instances, the memory system may be embedded with a circuit of the host system and the controller may be a multi-media controller.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus, comprising:
a host system configured to:
    generate a first command to access a logical memory address associated with a memory system;
    identify a physical memory address of the memory system based at least in part on the logical memory address of the first command; and
    output a second command and the physical memory address based at least in part on identifying the physical memory address, wherein outputting the second command comprises the host system being configured to receive, from the memory system, a configuration parameter based at least in part on outputting an initialization command to the memory system;
the memory system comprising:
    a memory device; and
    a controller coupled with the memory device and the host system, wherein the controller is configured to:
        receive the second command and the physical memory address from the host system, wherein the physical memory address is communicated using a protocol associated with the controller, wherein the configuration parameter indicates memory cells available to use the protocol; and access the memory cells in the memory device associated with the physical memory address based at least in part on receiving the second command and the physical memory address.

2. The apparatus of claim 1, wherein:
the configuration parameter is received at a first driver of the host system; and
the first driver is configured to access the memory cells in the memory device based at least in part on receiving the configuration parameter.

3. The apparatus of claim 1, wherein outputting the second command comprises the host system being configured to:
select a size of data to utilize in a set of memory cells different than the memory cells at the memory system based at least in part on outputting the second command.

4. The apparatus of claim 1, wherein the memory system further comprises a portion that is associated with a second protocol and the controller is further configured to:
refresh memory cells in the portion based at least in part on receiving the second command.

5. The apparatus of claim 1, wherein the memory system is further configured to initialize a boot procedure.

6. The apparatus of claim 5, wherein the memory system is further configured to utilize the protocol based at least in part on receiving the second command.

7. A host system, comprising:
one or more interfaces comprising one or more signal paths operable for communications with one or more memory systems; and
processing circuitry coupled with the one or more interfaces and configured to cause the host system to:
    transmit an initialization command;
    receive a configuration parameter associated with a first protocol in response to the initialization command;
    generate an access command to access a logical memory address associated with a memory system; and
    convert the access command into a second command in response to identifying, based on the configuration parameter, that a protocol being used by the memory system comprises the first protocol, the second command comprising a physical memory address of the memory system.

8. The host system of claim 7, wherein the processing circuitry is further configured to cause the host system to:
transmit the second command in response to converting the access command into the second command.

9. The host system of claim 7, wherein the processing circuitry is further configured to:
initialize the host system according to the first protocol in response to the configuration parameter by configuring the host system to access memory cells associated with the physical memory address.

10. The host system of claim 7, wherein the configuration parameter indicates memory cells available to use the first protocol.

11. The host system of claim 7, wherein the configuration parameter is received at a first driver of the host system, the first driver configured to access memory cells associated with the physical memory address in response to the configuration parameter.

12. The host system of claim 7, wherein the processing circuitry is further configured to cause the host system to:

select a size of data to utilize in a set of memory cells different than memory cells associated with the physical memory address in response to the second command.

13. A memory system, comprising:

one or more memory devices; and processing circuitry coupled with the one or more memory devices and configured to cause the memory system to:

receive an initialization command;

transmit a configuration parameter associated with a first protocol in response to the initialization command, wherein the configuration parameter indicates memory cells available to use the first protocol;

receive a command comprising a physical memory address of the memory system; and access memory cells associated with the physical memory address in response to the command.

14. The memory system of claim 13, wherein the processing circuitry is further configured to cause the memory system to:

refresh memory cells in a portion associated with a second protocol receiving the command.

15. The memory system of claim 13, wherein receiving the initialization command is in response to a boot procedure.

* * * * *